INVENTOR.
PHILIP H. SANFORD
BY
Lawrence H. Poston
AGENT

Aug. 5, 1969 P. H. SANFORD 3,459,045
INSTRUMENT SYSTEM RANGEABILITY DEVICE
Filed Nov. 9, 1967 3 Sheets-Sheet 3

INVENTOR.
PHILIP H. SANFORD
BY
Lawrence H. Patton
AGENT

United States Patent Office 3,459,045
Patented Aug. 5, 1969

3,459,045
INSTRUMENT SYSTEM RANGEABILITY DEVICE
Philip H. Sanford, Walpole, Mass., assignor to The Foxboro Company, Foxboro, Mass., a corporation of Massachusetts
Filed Nov. 9, 1967, Ser. No. 681,714
Int. Cl. G01l 9/00
U.S. Cl. 73—398                                     9 Claims

ABSTRACT OF THE DISCLOSURE

A differential pressure transmitter has a top assembly and a bottom assembly rotatably adjustable with respect to each other about a vertical axis. A force bar extends into both of the assemblies along a vertical axis and is pivotally mounted in the top assemby for movement in a single plane with respect to the pivot. A differential pressure responsive diaphragm unit within the bottom assembly is connected to the force bar, and an electrical output device including an electrical displacement detector and feedback mechanism is connected to the force bar in the top assembly.

---

This invention relates to instruments and systems for measurement and control, and has particular reference to rangeability devices and systems therefor.

In devices of this nature it is useful to provide adjustment of the rangeability in terms of changing the input-output ratio of a control, measurement, or operating signal.

In one form of the prior art, such adjustment has been accomplished by changing the moment of a lever by changing the location of the lever pivot along the length of the lever.

In this invention, a new and useful system is provided in which adjustment of an input signal to a lever is accomplished by input signal means which may be applied transversely to the lever along any one of several cross-sectional diameters. In terms of an elongate, round cross-section, pivoted lever, the input signal may be applied to the lever along any diameter in a given cross-section plane within a given angle, which may be something less than 90 degrees. This is ordinarily a coarse adjustment very useful in making one system adjustable to the needs of varied situations. Electronic, associated vernier adjustment may be provided where needed.

Thus, in this invention, in terms of a vertical shaft with an intermediate, horizontal effective pivot axis, with an input signal applied to the side of the shaft at the bottom, the input-output signal ratio may be adjusted by rotating the shaft and its pivot so that the input signal vector is changed. Such relative adjustment is similar in concept to the effect of wind on a sail which is angled more or less into the wind to get differing forces on a ship or boat.

This invention is exemplified herein by an electronic differential pressure transmitter. This device has a bottom works including a differential pressure diaphragm, a top works including detector and feedback devices, and a vertical force bar pivotally mounted on a horizontal axis basis in the top works, and restricted to movement in a single plane, wherein the force bar extends down into the bottom works. A signal transmitting flexure link from the differential pressure diaphragm is applied to the side of the force bar.

In this invention the top and bottom works are rotatably relatively adjustable with respect to each other so as to change the peripheral point on the force bar to which the differential pressure link is applied. The result is a change in the vector of the input signal and consequently a change in the input-output ratio of the transmitter.

This system of spanning according to this invention, is used to provide a step-wise span adjustment to an otherwise fixed span device, an advantage lies in the fact that force reduction at the input means less force bar bending in the plane to which the force bar movement is restricted.

In the illustrative embodiment of this invention presented herein, the bottom works is fixed, and the top works rotatably adjustable thereon. It is within the concept of this invention, with suitable mechanical changes, that the top works be fixed, and the bottom works adjustable, or both may be adjustable.

Other objects and advantages of this invention will be in part apparent and in part pointed out hereinafter and in the accompanying drawings, wherein.

Figure 1:
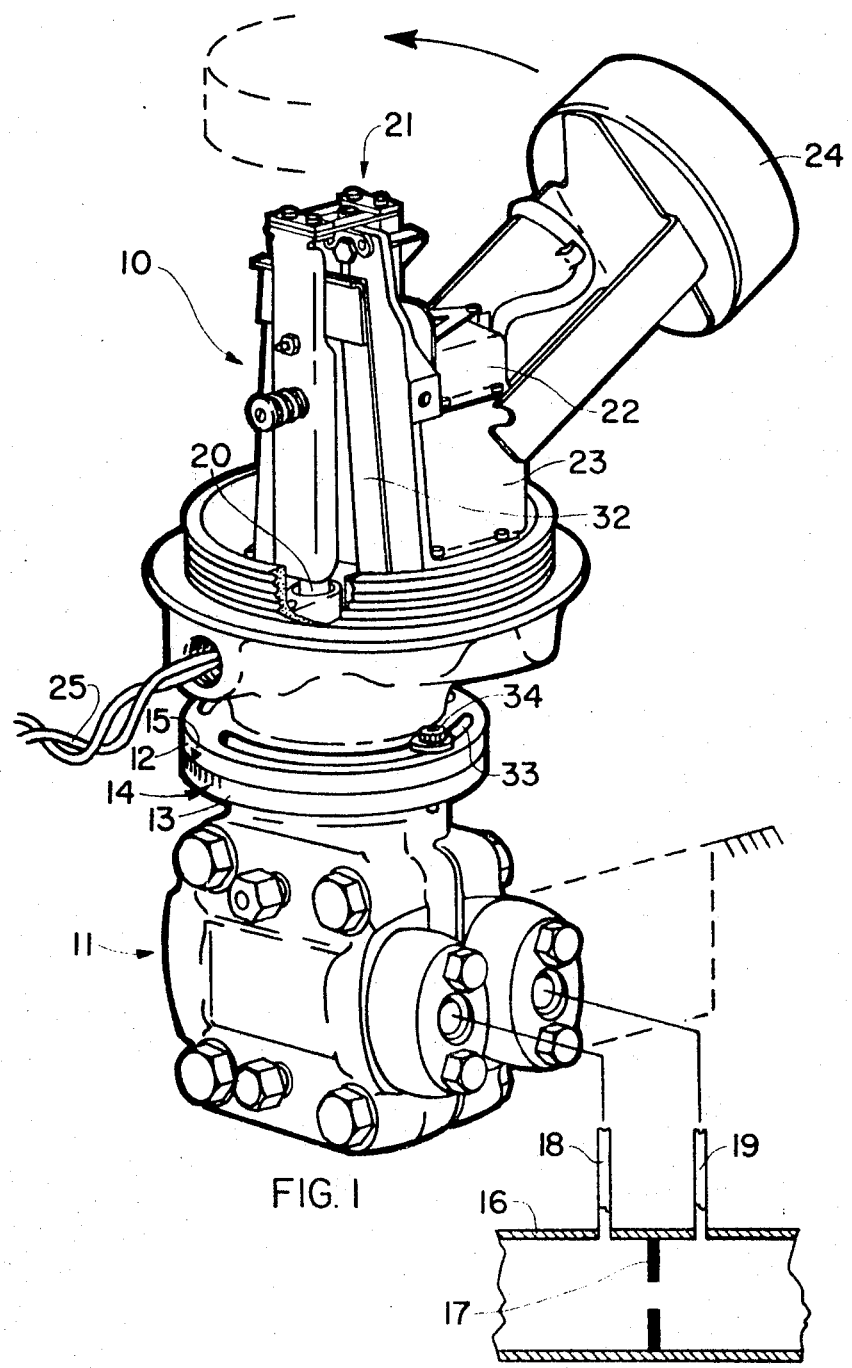
FIGURE 1 is an overall view of an electronic differential pressure transmitter embodying this invention.

In the overall of FIGURE 1, an electronic differential pressure transmitter is shown as an illustrative embodiment of this invention. The transmitter comprises a top works assembly 10 and a bottom works assembly 11. For purposes and in a manner set forth hereinafter, the top and bottom works 10 and 11 are rotatably coarsely adjustable with respect to each other about a vertical axis. A circular horizontal flange 12 on the bottom of the top works 10 matches and rests on a circular flange 13 on the top of the bottom works 11 with suitable sealing means therebetween. Part of a coarse scale 14 is shown on the periphery of the flange 12, with a co-operating indicator arrow 15 on the flange 13 to aid in the rotational adjustment. Vernier adjustment of the signal (not shown) may be provided in the electronic system of this device.

Figure 2:
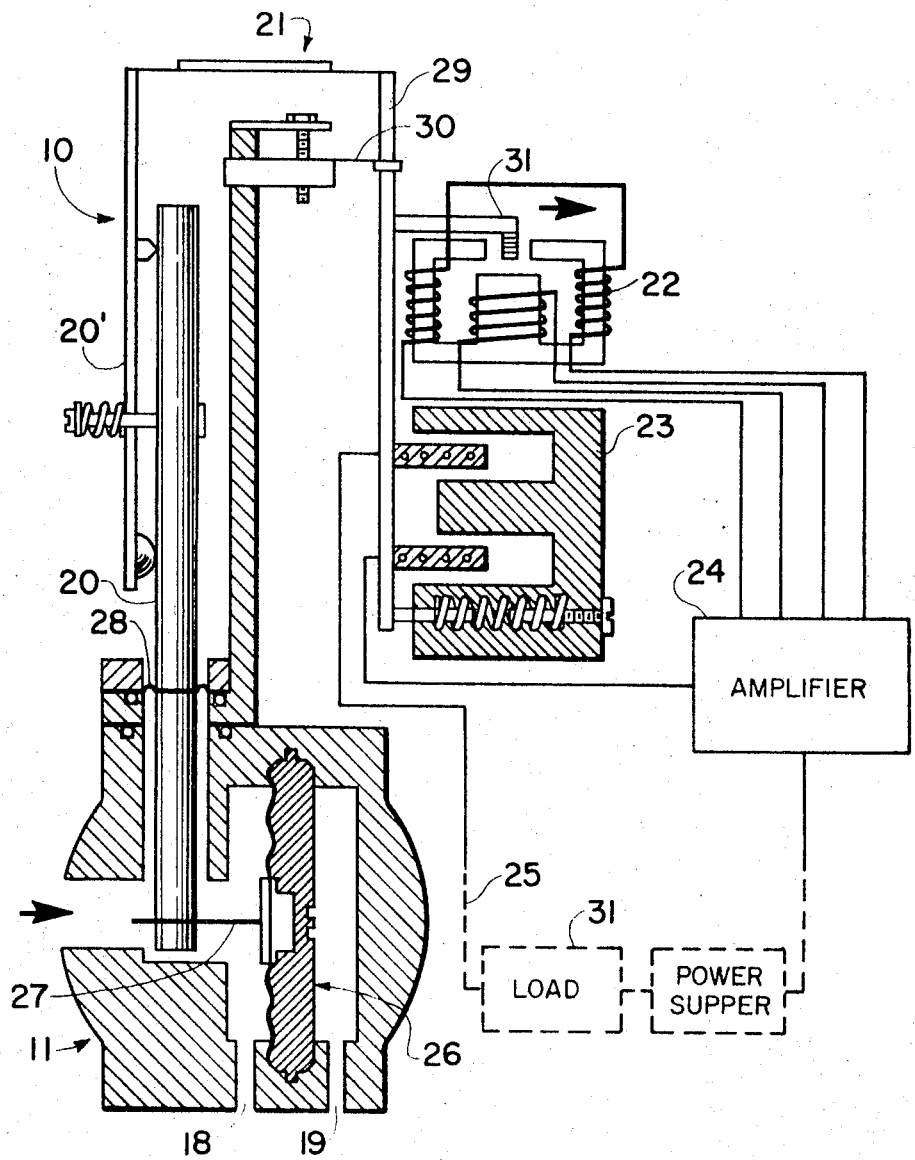
FIGURE 2 is a functional showing of the system of the transmitter of FIGURE 1, in further illustration of an embodiment of this invention.

In the FIGURE 1 illustration, the differential pressure transmitter measures fluid flow in a transmission pipe 16 by means of an orifice plate 17 and pressure taps 18 and 19 leading to opposite sides of a pressure capsule within the bottom works 11. The top works 10 includes a force bar 20, a linkage bridge 21, an electrical detector 22, an electrical feedback motor 23, and an amplifier 24. This system is shown in FIGURE 2. The electronic amplifier 24 is shown in FIGURE 1 as swung out of operating position, that position being indicated by the dotted outline over the top works 10. A suitable cover (not shown) may be placed over the top works and amplifier. The output of the transmitter is an electrical signal through output wires 25.

In FIGURE 2, the showing of the system of FIGURE 1 includes a differential pressure diaphragm unit 26 in the bottom works, with the pressure tap leads 18 and 19 leading to opposite sides of the diaphragm unit. A signal transmission member 27 is mounted on the diaphragm unit 26 and connected to the bottom of the force bar 20. The member 27 is provided, see FIGURE 5, with universal flexure points X, which permit the member to bend in any direction while maintaining the integrity of its force transmitted to the force bar 20.

As in FIGURE 2, the force bar 20 extends up through the bottom works 11, past the adjustment flanges 12 and 13, and into the top works 10. Supporting the force bar, sealing the top works from the bottom works, and providing a pivot function for the force bar 20 is a horizontally disposed flexible diaphragm 28, mounted in the top works and sealed around the force bar 20. Thus, as input signal force is applied transversely to the bottom of the force bar from the differential pressure unit 26, the force bar tends to pivot on the diaphragm 28.

On the upper part of the force bar 20, an overrange lever 20' is mounted, and extends above the top of the force bar into connection with one end of the linkage bridge 21, which has a flexure function as well as being a signal transmitting bridge. At the other end of the linkage bridge, a depending arm 29 is connected, with a flexure pivot part way down, as at 30. Movement of the arm 29 is applied to a movable core 31 in the electrical detector 22, and the resultant electrical output drives the feedback motor 23 to oppose the movement of the arm 29, and rebalance the system.

The amplifier 24 is used to drive the feedback motor 23 from the output signals of the detector 22. The output is an electrical signal to the load 31, representative of the differential pressure signal from the bottom works diaphragm unit 26.

Referring back to FIGURE 1, the top works 10 containing uprights 32 secured to the force bar which, with other similar back structure, allow the force bar to move only in one vertical plane, in the direction along the linkage bridge 21. Accordingly, in the planar situation of FIGURE 2, the input from the diaphragm unit 26 is at maximum span vector, that is, direct and in the same vertical plane as the movement of the force bar. The feedback motor output force is also applied to the same plane. This is the situation of minimum pressure span, with effect of the input direct and at 100%.

Figure 3:
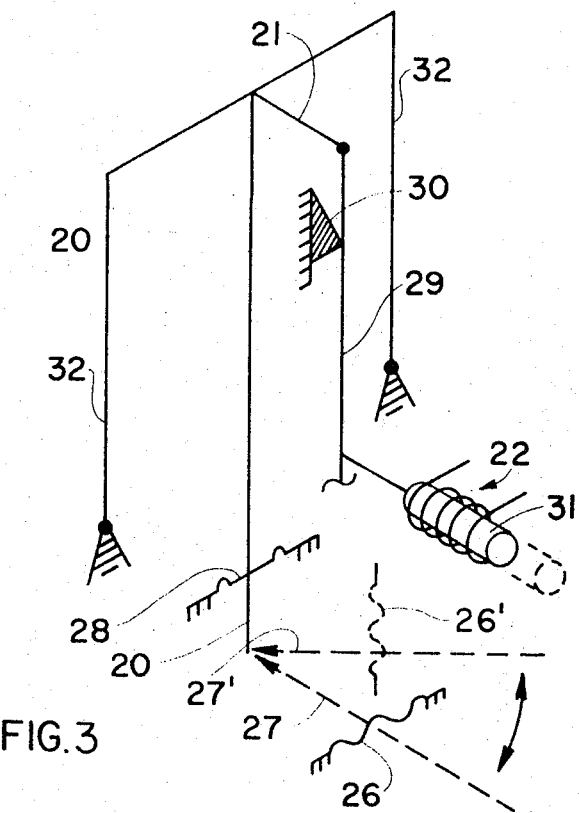
FIGURE 3 is a schematic of the system of FIGURES 1 and 2.
Figure 4:
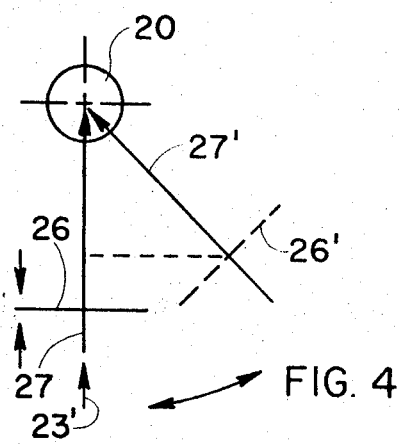
FIGURE 4 is an input force vector indicator, as applicable to the system of FIGURES 1, 2 and 3.
Figure 5:
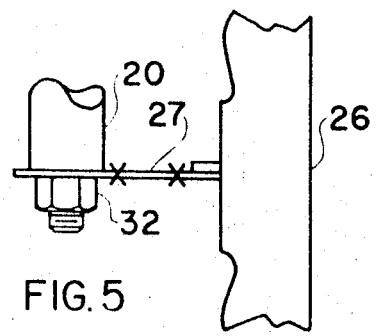
FIGURE 5 is a showing of adjustment structure involved in vector change in the system of FIGURES 1, 2 and 3.

The rangeability of the system of this invention, and how the span change is accomplished through the rotary adjustment of the top works 10 is illustrated in FIGURES 3, 4, and 5.

When the top works is to be rotatably adjusted on the bottom works, it is necessary to release two mechanical connections. One is the connection of the input member 27 at the bottom of the force bar. FIGURE 5 shows this connection by means of a stud and nut combination 32. This must be released so the force bar will be free to rotate with respect to the bottom works. After the adjustment, this connection is resecured. The second mechanical connection is between the top and bottom works housings, that is, between the flanges 12 and 13, FIGURE 1. A suitable arcuate slot 33 is provided in the top flange 12, and a bolt and nut combination 34 from the bottom flange 13 is releaseable to allow the adjustment, and then resecured. Such adjustments may be made at the factory or assembly point, but they may also be made in the field when necessary.

In FIGURES 3 through 5 like reference numbers are applied to like elements or element representations as referred to FIGURES 1 and 2.

In FIGURE 3, the input representation 27 is as in FIGURE 2, at 100%. That is, it is in the plane of movement of the force bar 20. In FIGURE 3, the reduced input 27' indicates an input angle change when the adjustment is made. The FIGURE 3 showing, as well as in FIGURE 4, is as if the bottom works were rotated. The result is the same, whichever structure is rotated. In FIGURE 3, the uprights 32, as in FIGURE 1, confine the movement of the force bar to a single vertical plane about the diaphragm flexure 28 as a pivot function. Through the top linkage bridge 21 and the depending lever 29, the signal input effect is transmitted to the detector 22. No feedback is shown in the illustration of FIGURE 3.

Accordingly, in FIGURE 3, when the adjustment to reduced input 27' has been made, the possible movement of the force bar 20 remains in the same plane, while the input signal is applied at an angle thereto, in a new plane. The input force vector is reduced by an amount proportional to the cosine of the angle of adjustment. The FIGURE 4 illustration shows this difference in a direct top view.

In the overall structure of the device, the top and bottom works are provided with suitable symmetry to make possible the rangeability adjustment of span without disturbing the other relationships in the system.

This invention thus provides a new and useful system for adjusting the input-output signal ratio of a signal transmission system.

As many embodiments may be made of the above invention, and as changes may be made in the embodiments set forth without departing from the scope of the invention, it is to be understood that all matter hereinbefore set forth or shown in the accompanying drawings is to be interpreted as illustrative only and not in a limiting sense.

I claim:

1. For use in an instrument or system for measurement or control, a signal transmission device comprising a pivoted member, means restricting the movement of said pivoted member to a single plane with respect to the pivot, means for applying an input signal to said member transversely of said member and away from said pivot, and means for relatively adjusting said pivoted member and said signal applying means with respect to each other to change the peripheral point of application of said input signal to said pivoted member so as to change the vector of said input signal with respect to said single plane, with the result that a different input-output ratio is provided in said signal transmission device.

2. A signal transmission device according to claim 1, in a balance system with feedback means responsive to the output of said device to apply a balancing signal to said pivoted member, wherein the vector of said balancing signal is in said single plane and remains therein without change by said adjustment.

3. A device according to claim 1 in a differential pressure cell transmitter system.

4. A device according to claim 1 in an electronic force balance differential pressure cell transmitter system.

5. A device according to claim 1 wherein said pivoted member is a force bar mounted through a flexible diaphragm as a sealing and pivot function.

6. An electronic differential pressure transmitter having top works and bottom works, a force bar extending into both said top and bottom works, a flexible diaphragm mounting for said force bar in said top works as a seal and pivot function for said force bar, means for restricting the movement of said force bar to a single plane with respect to said pivot function, pressure input signal applying means in said bottom works and applied transversely to said force bar to tend to move said force bar with respect to said diaphragm as a pivot, and means for rotatably relatively adjusting said top and bottom works whereby said pressure signal is applied to said force bar at a peripherally different point, resulting in a change in the vector of said input signal with respect to said single plane, and in a different input-output ratio in said transmitter.

7. An electronic transmitter according to claim 6 including electric sensing means responsive to the effect of said input signal on said force bar, electric feedback means responsive to said sensing means, and means for applying a feedback signal from said feedback means to said force bar in opposition to said input signal.

8. An electronic differential pressure transmitter comprising output top works and input bottom works, a signal transmitter force bar extending into both said top and bottom works and pivotally mounted in the top works, signal input means applied to said force bar within said bottom works, and means for relative rotation adjustment between said top and bottom works about the longitudinal axis of said force bar to change the input-output ratio of said transmitter.

9. A transmitter according to claim 8 wherein said bottom works is fixed, and said top works is rotatable thereon to provide said adjustment.

References Cited

UNITED STATES PATENTS

| 3,274,833 | 9/1966 | Ollivier et al. | 73—407 |
| 3,315,528 | 4/1967 | Hickox | 73—407 |

LOUIS R. PRINCE, Primary Examiner

D. O. WOODIEL, Assistant Examiner

U.S. Cl. X.R.

73—407